United States Patent [19]

Göbel et al.

[11] Patent Number: 4,491,600
[45] Date of Patent: Jan. 1, 1985

[54] PROCESS FOR CONCENTRATING AQUEOUS SOLUTIONS HAVING TEMPERATURE-SENSITIVE COMPONENTS

[75] Inventors: Gerd Göbel, Erkrath; Norbert Behr, Haan; Henk van der Mei, Rinteln; Franz-Josef Carduck, Haan; Othmar von Ettingshausen, Düsseldorf, all of Fed. Rep. of Germany

[73] Assignee: Henkel Kommanditgesellschaft auf Aktien, Düsseldorf-Holthausen, Fed. Rep. of Germany

[21] Appl. No.: 212,633

[22] Filed: Dec. 3, 1980

[30] Foreign Application Priority Data

Dec. 7, 1979 [DE] Fed. Rep. of Germany ....... 2949215

[51] Int. Cl.$^3$ .......................... A23C 1/06; B01D 13/00
[52] U.S. Cl. .................................. 426/384; 210/651; 426/490; 426/599
[58] Field of Search .............. 426/384, 490, 489, 495, 426/599; 210/650, 651, 652, 321.1; 62/532, 123; 159/DIG. 8

[56] References Cited

U.S. PATENT DOCUMENTS

| | | | |
|---|---|---|---|
| Re. 24,080 | 10/1955 | Toulmin, Jr. .................. | 426/384 |
| 2,614,048 | 10/1952 | Wenzelberger ................ | 426/384 |
| 2,806,796 | 9/1957 | Dorsey ......................... | 426/599 |
| 3,023,111 | 2/1962 | Huber ........................... | 426/384 |
| 3,402,047 | 9/1968 | Shaul ............................ | 426/384 |
| 3,552,574 | 1/1971 | Lowe et al. ................... | 426/490 |
| 3,821,108 | 6/1974 | Manjikian ..................... | 210/650 |
| 4,062,771 | 12/1977 | Saupe ........................... | 210/650 |
| 4,083,779 | 4/1978 | Combe et al. ................. | 210/651 |
| 4,227,999 | 10/1980 | Ebner ........................... | 210/650 |

FOREIGN PATENT DOCUMENTS

| | | |
|---|---|---|
| 1229166 | 3/1969 | Australia . |
| 2517928 | 11/1976 | Fed. Rep. of Germany . |
| 2202655 | 5/1974 | France . |

OTHER PUBLICATIONS

Lawler, "Freeze Concentrates Coffee Extract", Food Engineering, Apr. 1969, pp. 73–75.
Woodroof et al., Commercial Fruit Processing, The AVI Publishing Co., Inc., Westport, Conn., 1975, (pp. 282–287).

Primary Examiner—George Yeung
Attorney, Agent, or Firm—Hammond & Littell, Weissenberger & Dippert

[57] ABSTRACT

This invention relates to a process for concentrating aqueous solutions having temperature-sensitive components. More particularly, this invention relates to an improved process for concentrating aqueous solutions having temperature-sensitive components which comprises the steps of:

(a) subjecting the aqueous solution to an ultrafiltration procedure to provide a permeate solution and a residual solution; and
(b) subjecting the permeate solution from step (a) to freezing and removing ice crystals formed thereby.

3 Claims, 2 Drawing Figures

PROCESS FOR CONCENTRATING AQUEOUS SOLUTIONS HAVING TEMPERATURE-SENSITIVE COMPONENTS

FIELD OF THE INVENTION

This invention relates to a process for concentrating aqueous solutions having temperature-sensitive components. More particularly, this invention relates to an improved process for concentrating aqueous solutions having temperature-sensitive components with the use of a freeze-concentrating step.

BACKGROUND OF THE INVENTION

Liquid foods, particularly fruit and vegetable juices, fruit extracts, herb extracts, and the like, are examples of aqueous solutions that have temperature-sensitive properties, such as color or aroma, or that contain temperature-sensitive substances such as, vitamins or other active substances. Such aqueous solutions usually are obtained with very low concentrations of solids in the range from about 5 to 15 percent by weight of dry substance, based on the total weight of the solution. In general, it is desired to increase the solids content of these solutions by the removal of water, the most varied methods of concentration being used for this purpose.

The evaporation method frequently used for concentrating has the major disadvantage of exposing the solution, and thus also the substances dissolved in it, to elevated temperatures, which usually results in a concentrated product of low grade. Elevated temperatures always cause damage to the temperature-sensitive substances and properties, which results in a loss of vitamins, denaturation, or changes in the product determinable by the Maillard reaction, as well as loss of volatile components, such as aromas, that are removed from the concentrate together with the separated solvent, water.

In addition to extraction processes, which can be used in a very small number of exceptional cases, ultrafiltration or reverse osmosis offers the possibility of concentration of such aqueous solutions without thermal stress on the components. However, the final concentrations achievable with these two processes are limited because of high osmotic pressure, there being from 25 to 30 percent by weight of dry substance in the concentrate.

In contrast, freeze-concentrating of aqueous solutions having temperature-sensitive components proved to be a practicable method with which maximum solids concentrations of from about 40 to 42 percent by weight of dry substance can generally be obtained, depending on the characteristics of the product. Freeze-concentrating also represents a process for further, careful concentration of such solutions since the water is not separated via the vapor phase but via the crystalline phase in the form of ice. The low processing temperatures used for this purpose prevent a loss of components as well as their damage by chemical reactions, so that the dissolved, high-quality substances remain in the concentrate in unchanged amounts and composition. The separation of the ice from the concentrate is achieved with purely mechanical means such as centrifuging, filtering, or screening or also with the aid of washing columns. At present, the freeze-concentrating method is used variously to obtain high-quality concentrates, for example, in the food processing industry for the preparation of tea and coffee extracts.

While freeze-concentrating does have the advantages discussed above, it also has certain noteworthy disadvantages. Such disadvantages include, for example, higher costs, as compared to the costs of steam concentration processes, as well as the comparatively low final concentrations of dry substance in the concentrate that can be achieved. In addition, product losses become increasingly noticeable with a rising content of solids dissolved in the concentrate, which are caused by the adhering of concentrate and pulp to the separated ice crystals. A reduction of the product losses caused in this way can be achieved only by longer washing times and thus a considerably lower output of the entire process.

Thus, there has been a need to develop a process for the gentle concentrating of aqueous solutions having temperature-sensitive components, which process, on the one hand, includes a freeze-concentrating process but, on the other hand, avoids the above-mentioned disadvantages of this method. There is a particular need to obtain a concentrate with a higher solids content.

OBJECTS OF THE INVENTION

It is an object of the invention to provide a process for concentrating aqueous solutions.

It is also an object of the invention to provide a process for concentrating aqueous solutions of temperature-sensitive components with the use of a freeze-concentrating step.

It is a further object of the invention to provide a concentrate having a higher solids content than is achieved by conventional freeze-concentrating procedures.

It is a yet further object of the invention to provide a process for concentrating aqueous solutions whereby a freeze-concentrating step is proceeded by an ultrafiltration step.

These and other objects of the invention will become more apparent in the discussion below.

DETAILED DESCRIPTION OF THE INVENTION

Figure 1:
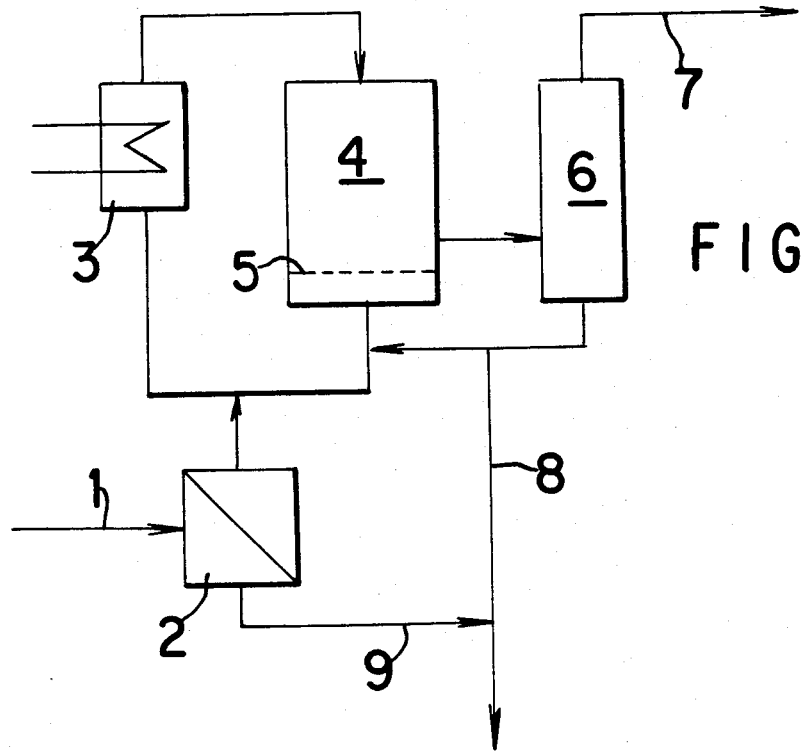
FIG. 1 is a flow diagram representing one embodiment of the invention.

The invention herein is directed to a process for concentrating an aqueous solution having temperature-sensitive components with the use of a freeze-concentrating phase, which process comprises the steps of:

(a) subjecting the aqueous solution to a separation by means of ultrafiltration to provide a permeate solution containing the majority of the temperature-sensitive components and a residual solution; and (b) subjecting the permeate solution from step (a) to freezing and removing ice crystals formed thereby.

It has been surprisingly found that the degree of effectiveness of a conventional freeze-concentrating process with respect to the final concentration of dry substance, or solids content, in the concentrate can be improved considerably by adding a separation process (a) in the form of an ultrafiltration procedure before the freeze concentrating step (b). It is important according to the invention that the content of macromolecular substances in the solution to be concentrated is reduced or that these substances are completely eliminated from the solution, by this separation process (a). For example, polymolecules, polysaccharides, coloring matter, pectins, and/or insoluble pulp can be separated from the solution with the aid of an ultrafiltration process. Factors limiting the freeze-concentrating process, which cause an increase in the viscosity of the concentrate during the freeze-concentration and thus also lower the performance of this concentrating phase, are removed in this manner. The temperature-sensitive and volatile components still present in the remaining solution, for example, aromas, can then be advantageously concentrated in the subsequent freeze-concentrating phase to high final concentrations. In addition, the time required for the washing of the resulting ice crystals, as well as the amount of water needed therefore, can be reduced considerably, and the product losses in the separated ice are markedly lower.

Additional advantages with respect to a more effective performance of the freeze-concentrating process result, according to the invention, from a combination of several separating methods. A combination of several separating methods can be considered as an additional separation step following the ultrafiltration. Accordingly, the solution separated in the ultrafiltration phase (a) and containing the temperature-sensitive substances can be subjected to an additional separation process in a phase, or step, (c), added before the freeze-concentrating step (b).

Suitable such separation procedures include, for example, reverse osmosis or an evaporation or adsorption process. Additional, less temperature-sensitive substances, such as mono- and disaccharides, can be eliminated from the solution to be concentrated with the aid of reverse osmosis, which again results in an increased concentration of the aroma components in the freeze-concentrating phase. Considerably higher concentration factors (10 to 30 times) can be reached in this manner for the low molecular components. When liquids containing solvents, that is, aqueous/alcoholic extracts, are present, an evaporator may be used advantageously as an additional separating phase, for example. The separation of the volatile solvent form the aqueous solution with the aid of an evaporation phase is advantageous with respect to the following freeze-concentrating process, inasmuch as a strong drop in the freezing temperatures is thereby prevented.

The use of a reverse osmosis procedure after ultrafiltration step (a) is a preferred embodiment of the invention.

The invention can perhaps be more readily appreciated and understood by referring to the drawings. In FIG. 1, solution 1, the aqueous solution to be concentrated, is fed to ultrafiltration means 2. In practice, ultrafiltration means 2 usually comprises several ultrafiltration units combined into one multi-phase unit to utilize the better performance of the entire equipment achievable thereby, even with low product concentrations. Conventional ultrafiltration equipment operates with various module types, for example, plate, pipe, spiral, or hollow fiber modules. Such ultrafiltration arrangements generally are operated with pressures in the range of from about 1 to 10 bar, with greater pressures causing greater permeation rates. However, the pressure resistance of the utilized membrane is the primarily crucial factor for the maximally applicable pressure. Ultrafiltration means 2 may also comprise reverse osmosis and/or evaporation means arranged downstream from the ultrafiltration equipment.

The ultrafiltration equipment employed can be conventional ultrafiltration devices for filtration under suction or pressure through a colloidal filter or semipermeable membrane. The purpose of the ultrafiltration is to remove from the aqueous solution higher molecular weight material.

The choice of membrane depends primarily on the material to be separated, that is, on the solution to be concentrated. A special separation problem requires the determination by experiment of the optimal membrane type with respect to selectivity, retention capacity, and permeation rate. Similar considerations apply as well to the selection of the membrane type needed for reverse osmosis. In addition to pressure and initial concentration of the solution, the components of the solution to be concentrated are crucial for the separating effect of reverse osmosis.

After the separation of the higher molecular weight components in the ultrafiltration and, if desired, reverse osmosis equipment, the solution containing lower molecular weight, temperature-sensitive components is fed into the crystallizing cycle of the freeze-concentrating unit.

As a rule, the conventional freeze-concentrating units consist of a cooling part, the actual crystallizer, where the growth of ice crystals is facilitated, as well as an appropriate separation and washing unit for the ice formed. The particular type of equipment parts to be used in the individual process steps of the freeze-concentrating process is not crucial to the process according to the invention. However, it is important that the parameters influencing the freeze-concentrating process, such as freezing temperature, remaining time in the crystallizer, as well as the types of devices used, are determined mainly by the composition of the solution to be concentrated, and the optimal values and conditions are to be established by proper experimentation. This also applies in the same way to the operation of the separation and washing equipment. All data concerning this part of the freeze-concentration equipment, for example, washing time, amounts of wash water, and water pressure, should be adjusted constantly according to the concentrate characteristics prevailing during the operation, so that the product losses in the separated water are preferably less than about 200 ppm. If desired, the freeze-concentrating unit may be constructed as a multi-step operation.

In the flow diagram of the process according to the invention shown in FIG. 1, the solution from ultrafiltration means 2 containing the temperature-sensitive components flows through a rotary cooler under pressure 3 into a crystallizer 4. Crystallizer 4 comprises an ice filter 5, through which ice-free solution passes and is re-circulated through rotary cooler 3 and crystallizer 4. A mixture of concentrate and ice water obtained in crystallizer 4 is, in the alternative, periodically removed from the crystallizer 4 and passed through washing column 6 to separate the ice crystals from the concentrate. Usually the ice and ice water mixture 7 separated in the washing column contains only small amounts of adhering or dissolved amounts of solids, which may be neglected. The concentrate 8 obtained in the freeze-concentrating process can be re-circulated in the crystallizing cycle for further concentration, if desired. Otherwise, this concentrate is removed directly from the washing column and, if desired, combined with the residual solution 9 collected from ulrafiltration means 2, which residual solution contains the substances of the starting solution separated by ultrafiltration or ultrafiltration and reverse osmosis.

However, in the sense of the process according to the invention, it has been found to be particularly advantageous to further concentrate the residual solution 9 collected in this separating process—to dryness, if desired—instead of recombining it immediately with the concentrate 8 obtained from the freeze-concentrating process. As this solution contains the less temperature-sensitive components of the starting solution, any conventional method in which the solution must be exposed to elevated temperatures can be used for further concentration without damage. Accordingly, the residual solutions collected in an ultrafiltration means or in an ultrafiltration and reverse osmosis means, which contain the less temperature-sensitive substances, are preferably subjected to an evaporation and/or drying process. Suitable means for such an evaporation and/or drying process are, for example, plate, descending film, thin-layer, or centrafugal evaporators as well as spray-, roller-, or foam-dryers.

The concentrate of residual solutions obtained in this manner can be finished or processed further, as is, or together with the concentrate 8 from the freeze-concentrating process. Preferably, however, the concentrates 8 obtained in the freeze-concentrating process are combined with the concentrate of residual solution resulting from the evaporation and/or drying process. Then, the use of the process according to the invention results in a highly concentrated substance with a content of 65% or more of dry substance which also contains the temperature-sensitive components of the starting solution in unchanged and gently concentrated form.

Figure 2:
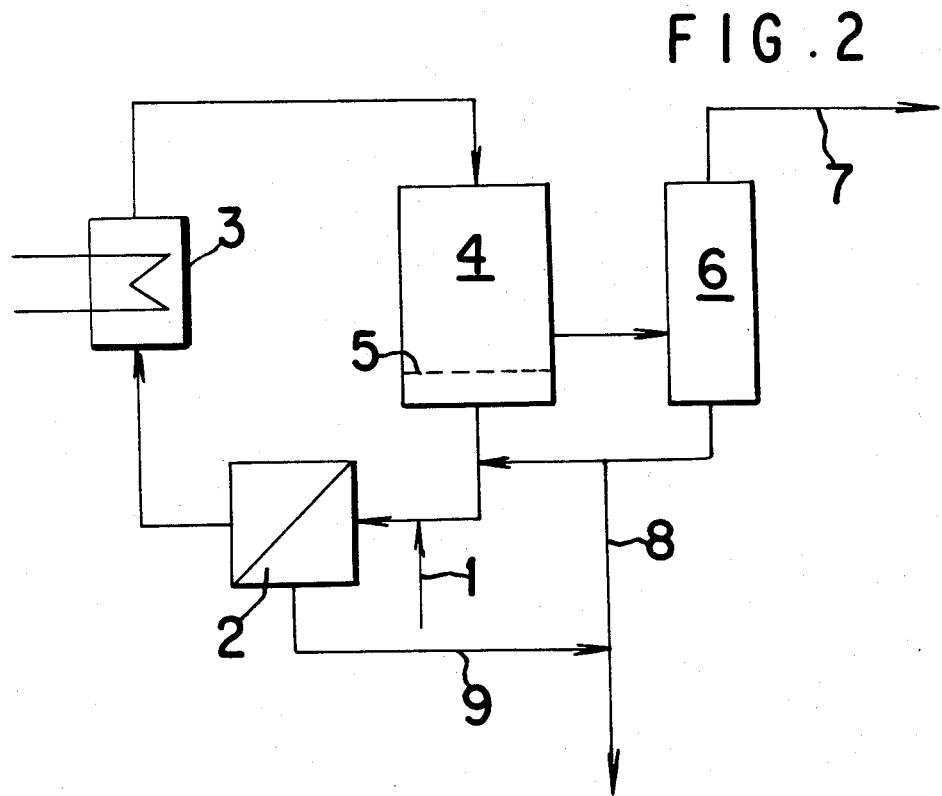
FIG. 2 is a flow diagram representing another embodiment of the invention.

An especially preferred form of the process of the invention is represented by FIG. 2. The ultrafiltration means or, if desired, ultrafiltration and reverse osmosis means 2, are integrated into the crystallizing cycle of the freeze-concentrating phase. Accordingly, the solutions containing temperature-sensitive components separated in ultrafiltration means 2 as well as the ice-free solution leaving the crystallizer 4 of the freeze concentrating phase, are re-circulated through ultrafiltration means 2 as well as the crystallizer 4. This arrangement of the separation methods in the cycle of the freeze-concentrating process offers the advantage that even substances that tend to precipitate or become turbid with a rising solids content due to exceeding the solubility limits, can be separated from this cycle and consequently do not lower the performance of the freeze-concentrating process.

The following examples are intended to illustrate the invention and are not to be construed as limiting the invention thereto.

EXAMPLES

Example 1

A strawberry mother juice having a solids content of 6.4% of dry substance (DS) was subjected to separation in an ultrafiltration unit having a cellulose acetate membrane (separation value: molecular weights of from 10,000 to 20,000) to separate polysaccharides, pectins, and coloring matter. The ultrafiltration unit was equipped with a 6 $m^2$ module from DDS, Denmark, and a membrane type 600. The unit was operated at a temperature of 20° C. and a pressure in the range from 8 to 10 bar, with a throughput of 1200 liter/hr. and a permeation rate of 15 liter/$m^2$hr. The permeate obtained, which contained little color, was then concentrated by freeze-concentrating. The utilized freeze-concentrating unit (pilot equipment type W 6 from Grenco, the Netherlands) had an output of 15 liter of $H_2O$/hr.

The effect of the ultrafiltration on the viscosity of the ultrafiltered juice during the freeze-concentrating step is shown in the table below:

TABLE

| Sample | Concentration (% dry substance) | Viscosity* before Ultrafiltration ($mm^2$/sec.) | Viscosity* after Ultrafiltration ($mm^2$/sec.) |
|---|---|---|---|
| A | 10 | 3 | 2.7 |
| B | 20 | 6 | 4 |
| C | 30 | 16 | 7 |
| D | 40 | 57 | 15 |
| E | 50 | — | 50 |

* = Viscosity at freezing temperature.

The solution separated in the ultrafiltration phase was further concentrated in an ultrafast evaporator (Centritherm CT 1B, from Alfa-Laval, Sweden), with an output of 50 kg of $H_2O$/hr.

The procedures and results of the process described above are set forth in the following schematic representation:

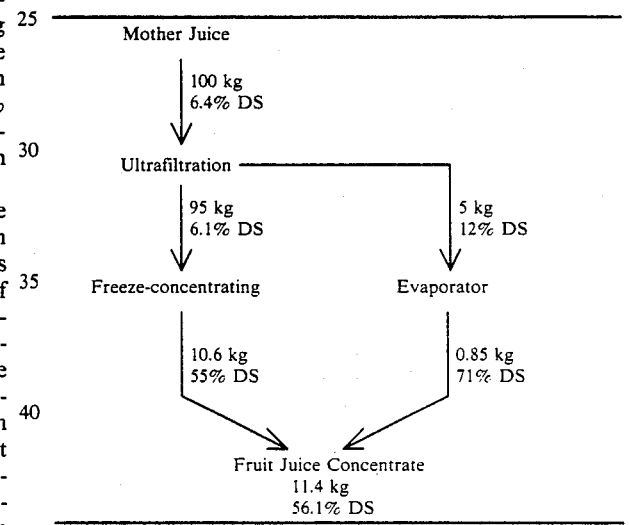

EXAMPLE 2

In accordance with the procedure of Example 1, unless otherwise noted, a cherry mother juice with a solids content of 12% of dry substance was subjected to separation by ultrafiltration operated with a cellulose acetate membrane at 7 bar, to separate polysaccharides, pectins, and coloring matter. The solution containing the separated substances was further concentrated in the ultrafast evaporator to a dry substance content of 70%.

The permeate obtained from the ultrafiltration unit, which contained little color, had sugar and aromas, was subjected to reverse osmosis. The reverse osmosis unit used was equipped with a 6 $m^2$ module from DDS, Denmark, and a membrane type 870. The unit was operated at a temperature of 5° C. and a pressure of 50 bar with a throughput of 1200 liter/hr. and a permeation rate of 7 liter/$m^2$hr. The sugar of the fruit as well as the rest of the coloring matter were separated in this reverse osmosis unit with the aid of a cellulose acetate membrane (separating value: molecular weight 500) and concentrated to a dry substance content of approximately 25%. The solution containing these substances was also concentrated to a dry substance content of 70% in the ultrafast evaporator.

The permeate containing the temperature-sensitive aroma components, which was obtained by reverse osmosis, was concentrated by subsequent freeze-concentrating to an 18.5 fold aroma concentrate with a dry substance content exceeding 53%.

The combined concentrates—from freeze-concentrating and evaporator phases—yielded a stable fruit juice concentrate with a dry substance content exceeding 65%, which produces a fruit juice identical to the natural product in taste, color, and consistency when rediluted with demineralized water.

The following schematic representation shows the manner in which the results were achieved:

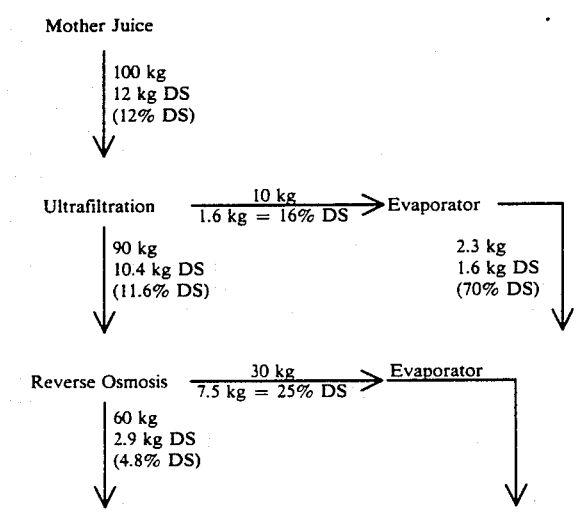

Freeze-Concentrating

```
5.4 kg                    10.7 kg
2.9 kg DS                 7.5 kg DS
(53% DS)                  (70% DS)
```

Fruit Juice Concentrate
18.4 kg
12 kg DS
(65% DS)

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the concentration of temperature-sensitive components in a substantially aqueous solution which consists essentially of the steps of:
   (a) subjecting the substantially aqueous solution to ultrafiltration in an ultrafiltration means to provide a permeate solution containing temperature-sensitive components and a residual solution containing non-temperature-sensitive components;
   (b) subjecting the residual solution from step (a) to evaporation, drying, or evaporation and drying to provide a concentrate thereof;
   (c) subjecting the permeate solution from step (a) to reverse osmosis;
   (d) subjecting the permeate solution from step (c) to freezing to provide ice crystals and remainder solution;
   (e) removing the ice crystals;
   (f) recovering the remainder solution; and
   (g) combining the concentrate from step (b) with the recovered remainder solution from step (f).

2. The process of claim 1 wherein the temperature-sensitive components are selected from the group consisting of color materials, aroma substances, and vitamins.

3. The process of claim 2, wherein the temperature-sensitive components are vitamins.

* * * * *